United States Patent
Kasai et al.

(10) Patent No.: US 9,491,788 B1
(45) Date of Patent: Nov. 8, 2016

(54) BICYCLE WIRELESS SYSTEM

(71) Applicant: Shimano Inc., Sakai, Osaka (JP)

(72) Inventors: Yoshiyuki Kasai, Osaka (JP); Ayumi Kato, Osaka (JP); Yoshinori Iino, Osaka (JP); Takao Harada, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/742,055

(22) Filed: Jun. 17, 2015

(51) Int. Cl.
*G06F 17/00* (2006.01)
*H04W 76/02* (2009.01)
*G06K 7/14* (2006.01)

(52) U.S. Cl.
CPC ............ *H04W 76/02* (2013.01); *G06K 7/1417* (2013.01)

(58) Field of Classification Search
CPC .... G06Q 30/02; G06Q 20/341; G06Q 30/06; G06Q 20/20; G06Q 10/08; G06Q 10/087; G07F 7/1008; G07B 15/02; G07B 15/00
USPC .......................... 235/375, 380, 383, 384, 385
See application file for complete search history.

(56) References Cited

U.S. PATENT DOCUMENTS

| | | | |
|---|---|---|---|
| 7,760,078 B2 | 7/2010 | Miki et al. | |
| 7,813,715 B2 | 10/2010 | McKillop et al. | |
| 7,913,297 B2 | 3/2011 | Wyld | |
| 8,181,233 B2 | 5/2012 | Wyld | |
| 8,909,424 B2 | 12/2014 | Jordan et al. | |
| 9,026,053 B2 | 5/2015 | Molettiere et al. | |
| 2013/0150028 A1* | 6/2013 | Akins ..................... | H04W 4/02 455/427 |

* cited by examiner

*Primary Examiner* — Karl D Frech
(74) *Attorney, Agent, or Firm* — Global IP Counselors (57) ABSTRACT

A bicycle wireless system is basically provided with a first bicycle component, a second bicycle component and a terminal device. The first bicycle component includes a first wireless communication unit. The second bicycle component includes a second wireless communication unit. The terminal device includes an identification acquiring section and a pairing section. The identification acquiring section is configured to acquire identification information from one of the first and second bicycle components. The pairing section is configured to pair the first and second bicycle components for wireless communications.

16 Claims, 6 Drawing Sheets

BICYCLE WIRELESS SYSTEM

BACKGROUND

Field of the Invention

This invention generally relates to a bicycle wireless system, a terminal device for pairing bicycle components and a bicycle component configured to be paired. More specifically, the present invention relates to pairing bicycle components.

Background Information

In recent years, some bicycles are provided with electric components or devices to make it easier for the rider to operate the bicycle. Some of these bicycles are provided with a bicycle wireless system in which bicycle components wirelessly communicate with each other. In such bicycle wireless systems, pairing between bicycle components is typically needed. Pairing is a process that associates two bicycle components so that they can communicate with each other. For example, some bicycles are provided with a wireless shifting system in which pairing between an operating device and a derailleur is necessary. One example of a wireless shifting system is disclosed in U.S. Pat. No. 8,909,424 in which pairing between an operating device and a derailleur is done by operating a shifting lever of the operating device and operating a switch provided on the derailleur.

SUMMARY

Generally, the present disclosure is directed to various features or components of a bicycle wireless system. In particular, the present disclosure is directed to pairing bicycle components.

In accordance with a first aspect of the present disclosure, a bicycle wireless system is provided that basically comprises a first bicycle component, a second bicycle component and a terminal device. The first bicycle component includes a first wireless communication unit. The second bicycle component includes a second wireless communication unit. The terminal device includes an identification acquiring section and a pairing section. The identification acquiring section is configured to acquire identification information from one of the first and second bicycle components. The pairing section is configured to pair the first and second bicycle components for wireless communications.

In accordance with a second aspect of the present invention, the bicycle wireless system according to the first aspect is configured so that the terminal device includes a third wireless communication unit. The identification acquiring section includes a receiver of the third wireless communication unit.

In accordance with a third aspect of the present invention, the bicycle wireless system according to the first aspect is configured so that the terminal device includes a third wireless communication unit. The pairing section is a transmitter of the third wireless communication unit.

In accordance with a fourth aspect of the present invention, the bicycle wireless system according to the first aspect is configured so that the pairing section is configured to wirelessly transmit the identification information to the other of the first and second bicycle components.

In accordance with a fifth aspect of the present invention, the bicycle wireless system according to the first aspect is configured so that the identification acquiring section includes a scanning device.

In accordance with a sixth aspect of the present invention, the bicycle wireless system according to the fifth aspect is configured so that the scanning device is configured to read indicia on the one of the first and second bicycle components.

In accordance with a seventh aspect of the present invention, the bicycle wireless system according to the sixth aspect is configured so that the scanning device is configured to read at least one of a two-dimensional barcode as the indicia on the one of the first and second bicycle components.

In accordance with an eighth aspect of the present invention, the bicycle wireless system according to the first aspect is configured so that the terminal device includes a database with the identification information and pairing information associated with the identification information.

In accordance with a ninth aspect of the present invention, the bicycle wireless system according to the eighth aspect is configured so that the pairing section is configured to wirelessly transmit the pairing information to the other of the first and the second bicycle components.

In accordance with a tenth aspect of the present invention, the bicycle wireless system according to the eighth aspect is configured so that the pairing information includes identification information of the other of the first and second bicycle components.

In accordance with an eleventh aspect of the present invention, the bicycle wireless system according to the first aspect is configured so that the terminal device is configured to access a remote database with the identification information and pairing information associated with the identification information.

In accordance with a twelfth aspect of the present invention, the bicycle wireless system according to the eleventh aspect is configured so that the pairing section is configured to wirelessly transmit the pairing information to the other of the first and the second bicycle components.

In accordance with a thirteenth aspect of the present invention, the bicycle wireless system according to the eleventh aspect is configured so that the pairing information includes identification information of the other of the first and second bicycle components.

In accordance with a fourteenth aspect of the present invention, the bicycle wireless system according to the first aspect is configured so that the identification acquiring section is configured to acquire a serial number as the identification information from one of the first and second bicycle components.

In accordance with a fifteenth aspect of the present invention, a terminal device is provided that basically comprises an identification acquiring section and a pairing section. The identification acquiring section is configured to acquire identification information from one of a first bicycle component and a second bicycle component. The first bicycle component includes a first wireless communication unit. The second bicycle component includes a second wireless communication unit. The pairing section is configured to pair the first and second bicycle components for wireless communications.

In accordance with a sixteenth aspect of the present invention, a bicycle component is provided that basically comprises a first wireless communication unit that is configured to wirelessly transmit identification information of the bicycle component to a terminal device or configured to wirelessly receive identification information of another bicycle component from a terminal device for wirelessly pairing the bicycle component and the another bicycle component.

Also other objects, features, aspects and advantages of the disclosed bicycle wireless system will become apparent to those skilled in the art from the following detailed description, which, taken in conjunction with the annexed drawings, discloses several illustrative embodiments of the bicycle wireless system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
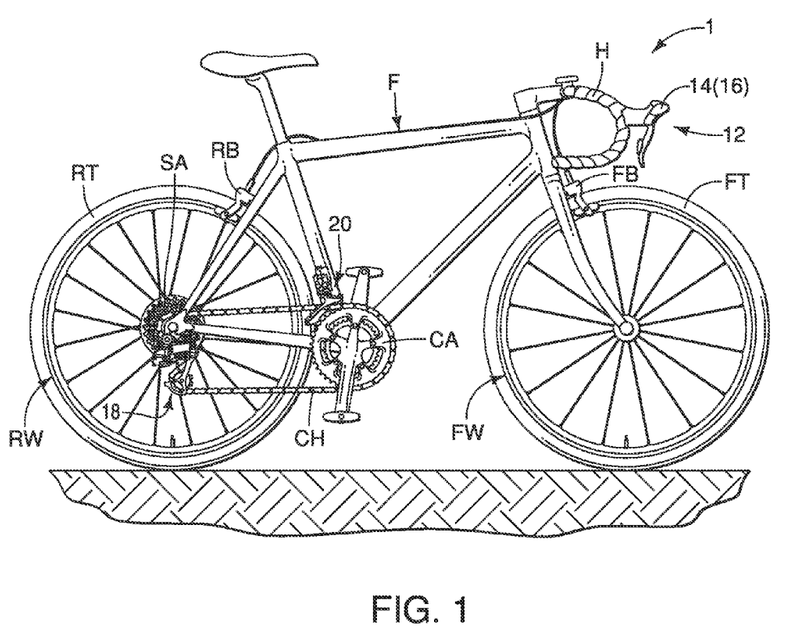
FIG. 1 is a side elevational view of a bicycle that is equipped with bicycle components that are part of a bicycle wireless system in accordance with the illustrated embodiments.

Referring initially to FIG. 1, a bicycle 1 is illustrated that is equipped with a bicycle wireless system 12 in accordance with a first embodiment. The bicycle wireless system 12 is an electrically powered system. In the illustrated embodiment, the bicycle wireless system 12 basically includes a first (rear) operating device 14, a second (front) operating device 16, a first (rear) bicycle electric shifting device 18 and a second (front) bicycle electric shifting device 20. Thus, the bicycle wireless system 12 is a bicycle electric shifting apparatus. However, the bicycle wireless system 12 is not limited to this particular arrangement. The bicycle wireless system 12 can be used with other systems and/or components of the bicycle 1, such as adjustable suspension, adjustable seatposts, bicycle computers, etc.

Basically, the bicycle wireless system 12 comprises a first electric component and a second electric component that are configured to wirelessly communicate. The first and second operating devices 14 and 16 are each an example of a first bicycle component of the bicycle wireless system 12. In the illustrated embodiment, the first and second operating devices 14 and 16 are shift operating devices that include a braking function. The first and second bicycle electric shifting devices 18 and 20 are each an example of a second bicycle component of the bicycle wireless system 12. Stated differently, each of the first bicycle components is an operating device, and each of the second bicycle components is a bicycle electric shifting device. Thus, in the first illustrated embodiment, the first and second bicycle electric shifting devices 18 and 20 are bicycle derailleurs, while the first and second operating devices 14 and 16 are shift operating devices. Specifically, the first bicycle electric shifting device 18 is a bicycle rear derailleur that is operated by the first operating device 14, while the second bicycle electric shifting device 20 is a bicycle front derailleur that is operated by the second operating device 16.

Referring to FIG. 1, the bicycle 1 includes, among other things, a bicycle frame F with a handlebar H, a front wheel FW, a rear wheel RW, a front brake FB and a rear brake RB. Referring again to FIG. 1, the front wheel FW is mounted in a conventional manner to a steering fork attached to the bicycle frame F below the handlebar H. A front tire FT is attached to the front wheel FW. The rear wheel RW includes a rear sprocket assembly SA. The rear wheel RW is mounted in a conventional manner to a rear portion of the bicycle frame F. A rear tire RT is attached to the rear wheel RW. A crank assembly CA, as shown in FIG. 1, is rotatably supported to a lower portion of the bicycle frame F in a conventional manner. The crank assembly CA includes a set of front sprockets mounted to the crank axle in a conventional manner. A chain CH is operatively coupled between the front sprockets and the rear sprockets in a conventional manner. Since the front wheel FW, the rear wheel RW, the front brake FB, the rear brake RB, the rear sprocket assembly SA and the crank assembly CA are all conventional elements, no further description is provided for the sake of brevity. Also, while the bicycle 1 is illustrated as a road bicycle, the bicycle wireless system 12 can be used with other types of bicycles.

Figure 2:
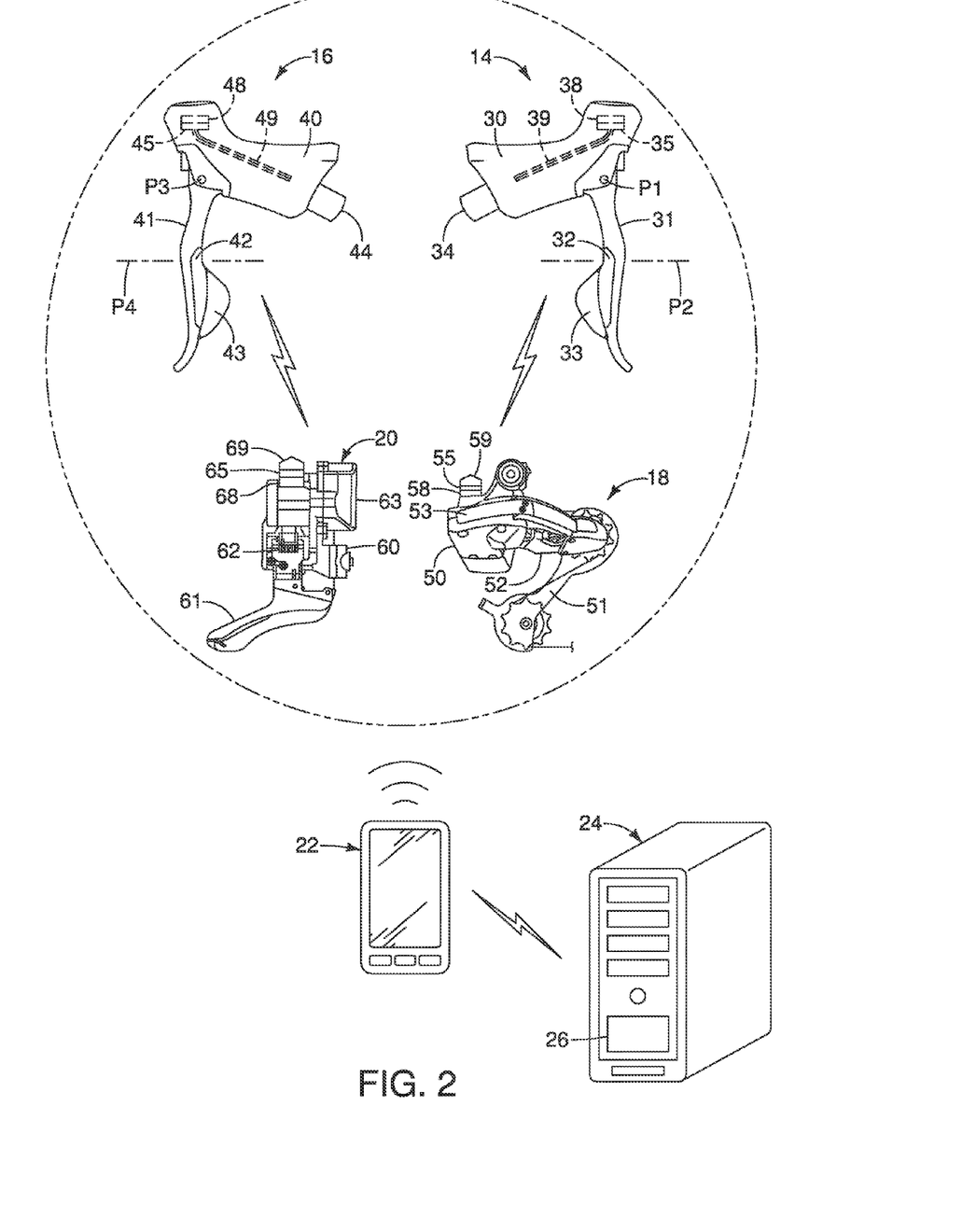
FIG. 2 is a schematic system diagram of an example of the bicycle wireless system including a terminal device communicating with a remote server having a remote database, a pair of operating devices (e.g., shift operating device) and pair of bicycle electric shifting devices (e.g., derailleurs) of the bicycle shown in FIG. 1.

As seen in FIG. 2, the bicycle wireless system 12 comprises a first bicycle component (e.g., the first and second operating devices 14 and 16), a second bicycle component (e.g., the first and second bicycle electric shifting devices 18 and 20) and a terminal device 22 (e.g., a tablet, a mobile phone, a portable computer, a desktop computer, etc.). Here, the first operating device 14 wirelessly communicates with the first bicycle electric shifting device 18 for carrying out first shifting operations, while the second operating device 16 wirelessly communicates with the second bicycle electric shifting device 20 for carrying out second shifting operations. Here, the terminal device 22 is used for pairing the first operating device 14 (i.e., a first bicycle component) with the first bicycle electric shifting device 18 (i.e., a second bicycle component), for pairing the second operating device 16 (i.e., a first bicycle component) with the second bicycle electric shifting device 20 (i.e., a second bicycle component). The terminal device 22 is used for other things such as calibrating the devices 14, 16, 18 and 20 and/or providing firmware and/or software updates for the devices 14, 16, 18 and 20. The terminal device 22 preferably communicates with a remote server 24 that has a remote database 26 (storage device having various data including but not limited to identification information for the devices 14, 16, 18 and 20 and pairing information associated with the identification information for the devices 14, 16, 18 and 20.

Figure 3:
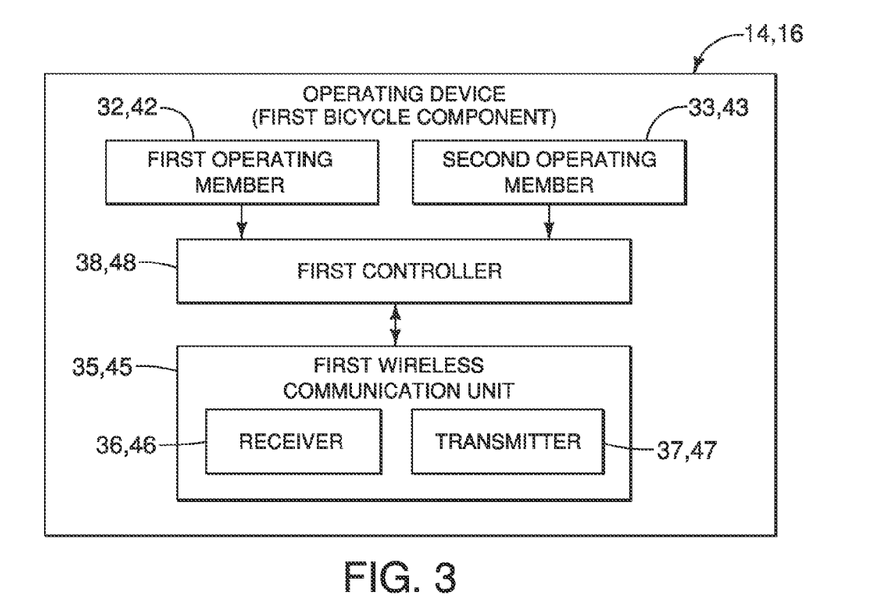
FIG. 3 is a simplified schematic block diagram of an example of one of the operating devices shown in FIG. 1.

Referring now to FIGS. 2 and 3, the first operating device 14 will now be discussed. Here, the first operating device 14 (i.e., right hand shift/brake operating device) controls the first bicycle electric shifting device 18 and the rear brake RB. Basically, the first operating device 14 includes a bracket 30, a brake operating member 31, a first shift operating member 32 and a second shift operating member 33. The first operating device 14 includes a bicycle frame attachment member 34 that attaches the bracket 30 to a right portion of the handlebar H in a conventional manner. The bracket 30 is preferably made of a lightweight material such as composite materials, plastic, polymers or light weight metals such as aluminum or titanium. Preferably, the bracket 30 is provided with an elastomeric grip cover. Here, the brake operating member 31 is a brake lever that is pivotally mounted to the bracket 30 about a pivot axis P1. Of course, the first operating device 14 is not limited to being mounted on the handlebar H. The first operating device 14 can be positioned anywhere within reach of the user. Thus, it will be apparent to those skilled in the bicycle field from this disclosure that the first operating device 14 is not limited to this configuration. The first operating device 14 constitutes a first bicycle component including at least one operating member.

As seen in FIG. 2, the first and second shift operating members 32 and 33 are pivotally mounted to the brake operating member 31 about a pivot axis P2. The first shift operating member 32 operates a first switch (not shown), which is mounted on the brake operating member 31, as the first shift operating member 32 pivots about the pivot axis P2 from a rest position (FIG. 2) to an operated position. The second shift operating member 33 operates a second switch (not shown) as the second shift operating member 33 pivots about the pivot axis P2 from a rest position (FIG. 2) to an operated position. The first and second shift operating members 32 and 33 are trigger levers that are biased to their rest positions such that they each automatically return to their rest positions upon being released from an operated position. The term "rest position" as used herein refers to a state in which a movable part (e.g., the first and second shift operating members 32 and 33) remains stationary without the need of a user intervening (e.g., holding the movable part) to establish a state corresponding to the rest position. Thus, the term "rest position" can also be referred to as a non-operated position. The first and second switches (not shown) on the brake operating member 31 can be any type of switches. For example, the first and second switches can include any type of toggle switch, pressure switch, contactless switch or any other suitable type of switch that provides an transmit signal in response to shifting movement of the first and second shift operating members 32 and 33 about the pivot axis P2 to effect upshifting and downshifting of the first bicycle electric shifting device 18 for carrying out second shifting operations.

As seen in FIG. 3, the first operating device 14 (i.e., the first bicycle component) includes a first wireless communication unit 35. The term "wireless communication unit" as used herein includes a transceiver or a transmitter-receiver, and contemplates any device or devices, separate or combined, capable of transmitting and receiving wireless signals, including shift signals or control, command or other signals related to some function of the component being controlled. The wireless control signals can be radio frequency (RF) signals or any other type of signal suitable for wireless communications as understood in the bicycle field. It should also be understood that the first wireless communication unit 35 can transmit the signals at a particular frequency and/or with an identifier such as a particular code, to distinguish the wireless control signal from other wireless control signals. In this way, the first bicycle electric shifting device 18 can recognize which control signals are upshifting signals for the first bicycle electric shifting device 18 and which control signals are downshifting signals for the first bicycle electric shifting device 18. Thus, the first bicycle electric shifting device 18 can ignore the control signals for the second bicycle electric shifting device 20. Here, the first wireless communication unit 35 includes a wireless receiver 36 and a wireless transmitter 37. Thus, the first wireless communication unit 35 is a two-way wireless communication unit that conducts two-way wireless communications using the wireless receiver 36 and the wireless transmitter 37.

As seen in FIG. 3, the first operating device 14 (i.e., the first bicycle component) includes a first controller 38. The first controller 38 is preferably a micro-computer that includes conventional components such as includes a central processing unit (CPU) or processor, an input interface circuit, an output interface circuit, and storage devices such as a ROM (Read Only Memory) device, a RAM (Random Access Memory) device and/or a FLASH memory device. The first controller 38 is programmed to process signals from the switches as upshifting signals and downshifting signals, respectively, for shifting the first bicycle electric shifting device 18.

The first controller 38 is electrically connected to the first and second switches (not shown) on the brake operating member 31 by electrical wires (not shown). The first controller 38 is also electrically connected to the first wireless communication unit 35. For example, the first controller 38 and the first wireless communication unit 35 can be provided on a printed circuit board that is mounted to the bracket 30. The first wireless communication unit 35 reads or otherwise receives operation signals from the first controller 38, and transmits wireless control signals indicative of the operation of the switches by the first shift operating member 32 and/or the second shift operating member 33.

As seen in FIG. 2, the first operating device 14 further includes an antenna 39 that is electrically connected to the first wireless communication unit 35 for transmitting signals indicative of the operation of the switches by the first and second shift operating members 32 and 33. In the first illustrated embodiment, the first operating device 14 (i.e., the first bicycle component) preferably further includes an electrical generator to generate electric power by movement of the first and/or second operating member 32 and/or 33. Alternatively, the first operating device 14 (i.e., the first bicycle component) preferably further includes a first on-board power source that can be provided on the printed circuit board for the first controller 38 and the first wireless communication unit 35. Thus, the first operating device 14 wirelessly transmits a control signal in response to an operation of the at least one operating member.

Referring to FIGS. 2 and 3, the second operating device 16 will now be discussed. Here, the second operating device 16 (i.e., left hand shift/brake control device) controls the second bicycle electric shifting device 20 and the front brake FB. Basically, the second operating device 16 includes a bracket 40, a brake operating member 41, a first shift operating member 42 and a second shift operating member 43. The second operating device 16 includes a bicycle frame attachment member 44 that attaches the bracket 40 to a left portion of the handlebar H in a conventional manner. The bracket 40 is preferably made of a lightweight material such as composite materials, plastic, polymers or light weight metals such as aluminum or titanium. Preferably, the bracket 40 is provided with an elastomeric grip cover. Here, the brake operating member 41 is a brake lever that is pivotally mounted to the bracket 42 about a pivot axis P3. Of course, the second operating device 16 is not limited to being mounted on the handlebar H. The second operating device 16 can be positioned anywhere within reach of the user. Thus, it will be apparent to those skilled in the bicycle field from this disclosure that the second operating device 16 is not limited to this configuration. The second operating device 16 also constitutes a first bicycle component including at least one operating member.

The first and second shift operating members 42 and 43 are pivotally mounted to the brake operating member 41 about a pivot axis P4. The first shift operating member 42 operates a first switch (not shown), which is mounted on the brake operating member 41, as the first shift operating member 42 pivots about the pivot axis P4 from a rest position (FIG. 2) to an operated position. The second shift operating member 43 operates a second switch (not shown), which is mounted on the brake operating member 41, as the second shift operating member 43 pivots about the pivot axis P4 from a rest position (FIG. 2) to an operated position. The first and second shift operating members 42 and 43 are trigger levers that are biased to their rest positions such that they each automatically return to their rest positions upon being released from an operated position. The first and second switches (not shown) on the brake operating member 41 can be any type of switches. For example, the first and second switches (not shown) can include any type of toggle switch, pressure switch, contactless switch or any other suitable type of switch that provides an output signal in response to shifting movement of the first and second shift operating members 42 and 43 about the pivot axis P4 to effect upshifting and downshifting of the second bicycle electric shifting device 20 for carrying out second shifting operations.

As seen in FIG. 3, the second operating device 16 (i.e., the first bicycle component) includes a first wireless communication unit 45. Here, the first wireless communication unit 45 includes a wireless receiver 46 and a wireless transmitter 47. In this way, the first wireless communication unit 45 is capable of transmitting and receiving wireless signals, including shift signals or control, command or other signals related to some function of the component being controlled. The wireless control signals can be radio frequency (RF) signals or any other type of signal suitable for wireless communications as understood in the bicycle field. It should also be understood that the first wireless communication unit 45 can transmit the signals at a particular frequency and/or with an identifier such as a particular code, to distinguish the wireless control signal from other wireless control signals. In this way, the second bicycle electric shifting device 20 can recognize which control signals are upshifting signals for the second bicycle electric shifting device 20 and which control signals are downshifting signals for the second bicycle electric shifting device 20. Thus, the second bicycle electric shifting device 20 can ignore the control signals for the first bicycle electric shifting device 18. Thus, the first wireless communication unit 45 is a two-way wireless communication unit that conducts two-way wireless communications using the wireless receiver 46 and the wireless transmitter 47.

As seen in FIG. 3, the second operating device 16 (i.e., the first bicycle component) also includes a first controller 48. The first controller 48 is preferably a micro-computer that includes conventional components such as includes a central processing unit (CPU) or processor, an input interface circuit, an output interface circuit, and storage devices such as a ROM (Read Only Memory) device, a RAM (Random Access Memory) device and/or a FLASH memory device. The first controller 48 is programmed to process signals from the switches as upshifting signals and downshifting signals, respectively, for shifting the second bicycle electric shifting device 20.

The first controller 48 is electrically connected to the first and second switches (not shown) on the brake operating member 41 by electrical wires (not shown). The first controller 48 is also electrically connected to the first wireless communication unit 45. For example, the first controller 48 and the first wireless communication unit 45 can be provided on a printed circuit board that is mounted to the bracket 40. The first wireless communication unit 45 reads or otherwise receives operation signals from the first controller 48, and transmits wireless control signals indicative of the operation of the switches by the first shift operating member 42 and/or the second shift operating member 43.

As seen in FIG. 2, the second operating device 16 further includes an antenna 49 that is electrically connected to the first wireless communication unit 45 for transmitting signals indicative of the operation of the switches by the first and second shift operating members 42 and 43. In the first illustrated embodiment, the second operating device 16 (i.e., the first bicycle component) preferably further includes an electrical generator to generate electric power by movement of the first and/or second operating member 42 and/or 43. Alternatively, the second operating device 16 (i.e., the first bicycle component) preferably further includes a first on-board power source that can be provided on the printed circuit board for the first controller 48 and the first wireless communication unit 45. Thus, the second operating device 16 constitutes a first wireless communication unit that wirelessly transmits a control signal in response to an operation of the at least one operating member.

Figure 4:
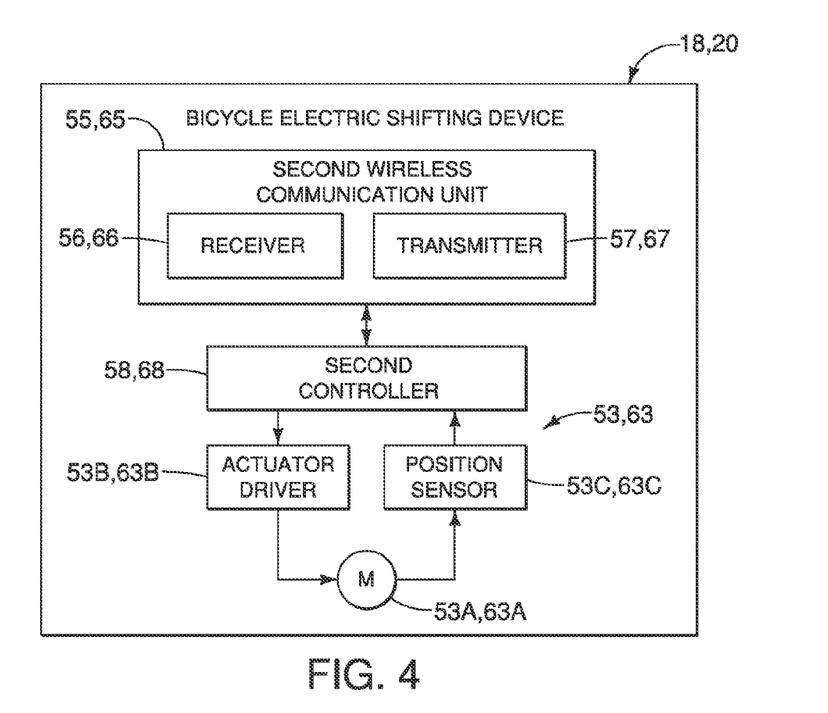
FIG. 4 is a simplified schematic block diagram of an example of one of the bicycle electric shifting devices (e.g., one of the rear and front derailleurs) of the bicycle shown in FIG. 1.

Referring now to FIGS. 2 and 4, the first and second bicycle electric shifting devices 18 and 20 will now be discussed. As mentioned above, the first and second bicycle electric shifting devices 18 and 20 are bicycle derailleurs. However, it will be apparent to those skilled in the bicycle field from this disclosure that the bicycle electric shifting devices are not limited to bicycle derailleurs. For example, the rear bicycle electric shifting device can be an internally geared hub.

As seen in FIG. 2, the first bicycle electric shifting device 18 has a base member 50, a chain guide 51 and a linkage 52. The base member 50 is configured to be attached to the bicycle frame F adjacent to the rear sprocket assembly SA by a bolt. The chain guide 51 is movably supported relative to the base member 50. Specifically, in the first illustrated embodiment, the linkage 52 movably supports the chain guide 51 relative to the base member 50. Here, the linkage 52 includes two links that are pivotally connected between the base member 50 and the chain guide 51 to form a four-bar linkage. The first bicycle electric shifting device 18 (the second electric component) further includes an actuation mechanism 53 that is mechanically connected to the linkage 52. Here, the actuation mechanism 53 includes an electric actuator 53A (motor M), an actuator driver 53B and a position sensor 53C. Operation of the electric actuator 53A moves the linkage 52, which in turn moves the chain guide 51 relative to the base member 50. The electric actuator 53A is operated based on wireless control signals from the first operating device 14. Here, the electric actuator 53A is a reversible electric motor.

In order to receive and process the wireless control signals from the first operating device 14, the first bicycle electric shifting device 18 (the second bicycle component) further includes a second wireless communication unit 55. Here, the second wireless communication unit 55 includes a wireless receiver 56 and a wireless transmitter 57. In this way, the second wireless communication unit 55 is capable of transmitting and receiving wireless signals, including shift signals or control, command or other signals related to some function of the component being controlled. The wireless control signals can be radio frequency (RF) signals or any other type of signal suitable for wireless communications as understood in the bicycle field. It should also be understood that the second wireless communication unit 55 can transmit the signals at a particular frequency and/or with an identifier such as a particular code, to distinguish the wireless control signal from other wireless control signals. In this way, the first bicycle electric shifting device 18 can recognize which control signals are upshifting signals, and which control signals are downshifting signals. Thus, the first bicycle electric shifting device 18 can ignore the control signals for the second bicycle electric shifting device 20. Thus, the second wireless communication unit 55 is a two-way wireless communication unit that conducts two-way wireless communications using the wireless receiver 56 and the wireless transmitter 57.

As seen in FIG. 2, the first bicycle electric shifting device 18 (the second bicycle component) further includes a second controller 58. The second controller 58 is preferably a micro-computer that includes conventional components such as includes a central processing unit (CPU) or processor, an input interface circuit, an output interface circuit, and storage devices such as a ROM (Read Only Memory) device, a RAM (Random Access Memory) device and/or a FLASH memory device. The second controller 58 is programmed to process signals from the switches of the first operating device 14 as upshifting signals and downshifting signals, respectively, for shifting the first bicycle electric shifting device 18.

As seen in FIG. 2, the first bicycle electric shifting device 18 (the second bicycle component) further includes an antenna 59 that is electrically connected to the second wireless communication unit 55 for transmitting signals indicative of the operation of the switches by the first and second shift operating members 32 and 33. In the first illustrated embodiment, the first bicycle electric shifting device 18 (i.e., the second bicycle component) preferably further includes a first on-board power source that can be provided on the printed circuit board for the second controller 58 and the second wireless communication unit 55. Alternatively, in the first illustrated embodiment, the first bicycle electric shifting device 18 (i.e., the second bicycle component) is preferably configured to be electrically connected to a rechargeable battery mounted on the bicycle frame F for receiving the electric power. Thus, the first operating device 14 wirelessly transmits a control signal in response to an operation of the at least one operating member.

As seen in FIG. 2, the second bicycle electric shifting device 20 has a base member 60, a chain guide 61 and a linkage 62. The base member 60 is configured to be attached to the bicycle frame F adjacent to the crank assembly CA by a bolt. The chain guide 61 is movably supported relative to the base member 60. Specifically, in the first illustrated embodiment, the linkage 62 movably supports the chain guide 61 relative to the base member 60. Here, the linkage 62 includes two links that are pivotally connected between the base member 60 and the chain guide 61 to form a four-bar linkage. The second bicycle electric shifting device 20 (the second electric component) further includes an actuation mechanism 63 that is mechanically connected to the linkage 62. Here, the actuation mechanism 63 includes an electric actuator 63A (motor M), an actuator driver 63B and a position sensor 63C. Operation of the electric actuator 63A moves the linkage 62, which in turn moves the chain guide 61 relative to the base member 60. The actuator 63 is operated based on wireless control signals from the second operating device 16. Here, the electric actuator 63A is a reversible electric motor.

In order to receive and process the wireless control signals from the second operating device 16, the second bicycle electric shifting device 20 (the second bicycle component) further includes a second wireless communication unit 65. Here, the second wireless communication unit 65 includes a wireless receiver 66 and a wireless transmitter 67. In this way, the second wireless communication unit 65 is capable of transmitting and receiving wireless signals, including shift signals or control, command or other signals related to some function of the component being controlled. The wireless control signals can be radio frequency (RF) signals or any other type of signal suitable for wireless communications as understood in the bicycle field. It should also be understood that the second wireless communication unit 65 can transmit the signals at a particular frequency and/or with an identifier such as a particular code, to distinguish the wireless control signal from other wireless control signals. In this way, the second bicycle electric shifting device 20 can recognize which control signals are upshifting signals, and which control signals are downshifting signals. Thus, the second bicycle electric shifting device 20 can ignore the control signals for the second bicycle electric shifting device 20. Thus, the second wireless communication unit 65 is a two-way wireless communication unit that conducts two-way wireless communications using the wireless receiver 66 and the wireless transmitter 67.

As seen in FIG. 2, the second bicycle electric shifting device 20 (the second bicycle component) further includes a second controller 68. The second controller 68 is preferably a micro-computer that includes conventional components such as includes a central processing unit (CPU) or processor, an input interface circuit, an output interface circuit, and storage devices such as a ROM (Read Only Memory) device, a RAM (Random Access Memory) device and/or a FLASH memory device. The second controller 68 is programmed to process signals from the switches of the second operating device 16 as upshifting signals and downshifting signals, respectively, for shifting the second bicycle electric shifting device 20.

As seen in FIG. 2, the second bicycle electric shifting device 20 (the second bicycle component) further includes an antenna 69 that is electrically connected to the second wireless communication unit 65 for transmitting signals indicative of the operation of the switches by the first and second shift operating members 42 and 43. In the first illustrated embodiment, the second bicycle electric shifting device 20 (i.e., the second bicycle component) preferably further includes a first on-board power source that can be provided on the printed circuit board for the second controller 68 and the second wireless communication unit 65. Alternatively, in the first illustrated embodiment, the second bicycle electric shifting device 20 (i.e., the second bicycle component) is preferably configured to be electrically connected to a rechargeable battery mounted on the bicycle frame F for receiving the electric power. Thus, the second operating device 16 wirelessly transmits a control signal in response to an operation of the at least one operating member.

Figure 5:
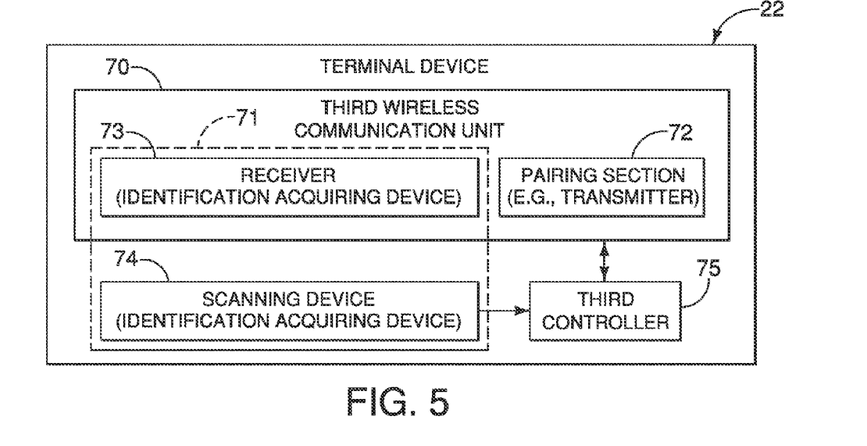
FIG. 5 is a simplified schematic block diagram of an example of one of the terminal device that communicates with a remote server and at least one bicycle component (the operating devices and bicycle electric shifting devices) of the bicycle shown in FIG. 1.

Referring now to FIG. 5, the terminal device 22 will now be discussed. Here, the terminal device 22 includes a third wireless communication unit 70. The terminal device 22 includes an identification acquiring section 71 and a pairing section 72. The identification acquiring section 71 includes a receiver 73 of the third wireless communication unit 70 as a first identification acquiring device of the identification acquiring section 71. In this way, the identification acquiring section 71 is configured to acquire identification information from one of the first and second bicycle components (e.g., one of the devices 14, 16, 18 and 20). The pairing section 72 is a transmitter of the third wireless communication unit 70. In this way, the pairing section 72 is configured to wirelessly transmit the identification information to the other of the first and second bicycle components (e.g., one of the devices 14, 16, 18 and 20). As discussed below, the pairing section 72 is configured to pair the first and second bicycle components (e.g., the devices 14, 16, 18 and 20) for wireless communications. In the illustrated embodiment, the identification acquiring section 71 includes a scanning device 74 as a second identification acquiring device of the identification acquiring section 71. The scanning device 74 is configured to read indicia on the one of the first and second bicycle components (e.g., one of the devices 14, 16, 18 and 20). The scanning device 74 is configured to read at least one of a two-dimensional barcode as the indicia on the one of the first and second bicycle components (e.g., one of the devices 14, 16, 18 and 20).

Basically, the pairing section 72 is configured to wirelessly transmit the identification information to the other of the first and second bicycle components (e.g., the devices 14, 16, 18 and 20). The first wireless communication unit 35 is configured to wirelessly transmit identification information of the bicycle component (e.g., one of the devices 14, 16, 18 and 20) to the terminal device 22, or configured to wirelessly receive identification information of another bicycle component from the terminal device 22 for wirelessly pairing the bicycle component (e.g., a first one of the devices 14, 16, 18 and 20) and the another bicycle component (e.g., second one of the devices 14, 16, 18 and 20 that is associated with the first one of the devices 14, 16, 18 and 20).

The identification acquiring section 71 includes a scanning device 74. The scanning device 74 is configured to read indicia on the one of the first and second bicycle components (e.g., one of the devices 14, 16, 18 and 20). The scanning device 74 is configured to read a two-dimensional barcode as the indicia on the one of the first and second bicycle components (e.g., one of the devices 14, 16, 18 and 20).

Figure 6:
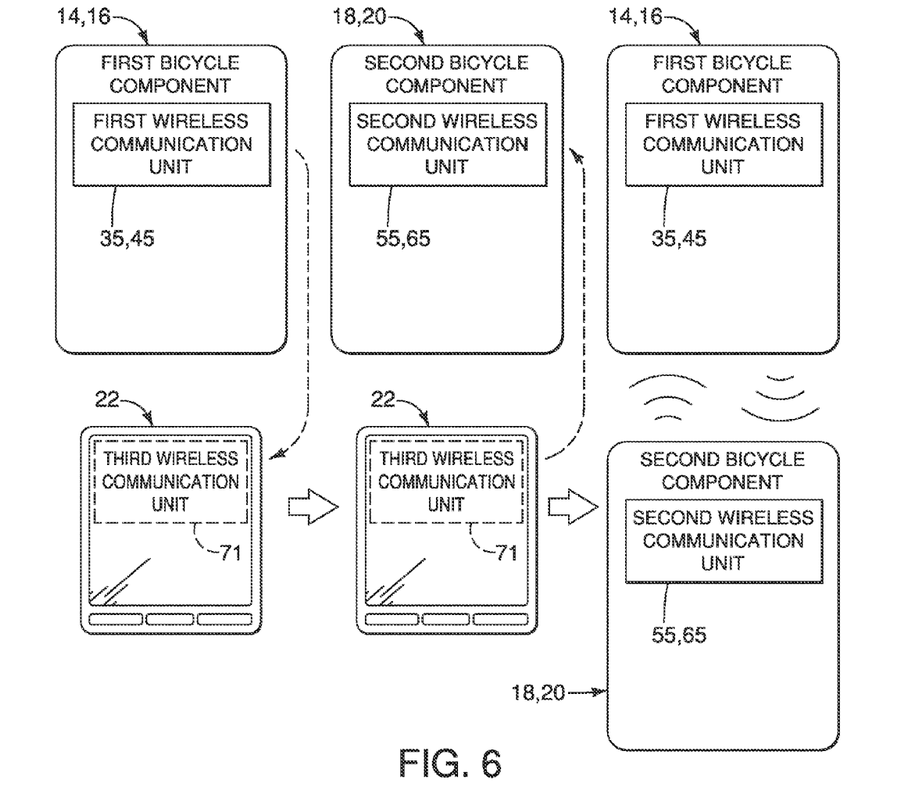
FIG. 6 is a schematic pairing process diagram illustrating a first pairing process.

Referring now to FIG. 6, a first pairing process will be discussed. In first pairing process, the receiver 73 of the third wireless communication unit 70 is used as the identification acquiring device for obtaining identification information from one of the first bicycle component 14 or 16. Therefore, in the first pairing process, the scanning device 74 can be omitted from the terminal device 22. In particular, the terminal device 22 is brought into a wireless communication area of the first wireless communication unit 35 or 45 of the first bicycle component 14 or 16 such that the receiver 73 of the third wireless communication unit 70 can receive a pairing signal of the first wireless communication unit 35 or 45 of the first bicycle component 14 or 16. The pairing signal can have a unique pairing code or identification data (e.g., serial number and MAC address) that is assigned to the first bicycle component 14 or 16 by the manufacturer. The pairing signal can be either automatically wirelessly transmitted for a prescribed period of time after the first bicycle component 14 or 16 is turned on, or by manually depressing a button on the first bicycle component 14 or 16 to wirelessly transmit the pairing signal the pairing signal for a prescribed period of time.

Upon the receiver 73 detecting the pairing signal of the first wireless communication unit 35 or 45 of the first bicycle component 14 or 16, the third controller 75 stores the pairing signal into the RAM. Next, the terminal device 22 is brought into the wireless communication area of the second wireless communication unit 55 or 65 of the second bicycle component 18 or 20 such that the receiver 56 or 66 of the second wireless communication unit 55, 65 can detect the pairing signal of the transmitter or pairing section 72 of the terminal device 22. Thus, the transmitter or pairing section 72 of the terminal device 22 transmits the pairing signal of the first bicycle component 14 or 16 to the second bicycle component 18 or 20. The receiver 56 or 66 of the second wireless communication unit 55, 65 detects the pairing signal from the terminal device 22. The second controller 58 and 68 stores the pairing signal into the RAM and then configures the second wireless communication unit 55, 65 to transmit and receive control signals to and from the bicycle component 14 or 16. Alternatively, the first pairing process can be performed by the terminal device 22 first communicating with the second bicycle component 18 or 20 to obtain the unique pairing code or identification data, then the transmitting the unique pairing code or identification data to the first bicycle component 14 or 16.

Alternatively, in the first pairing process, NFC protocol can be utilized. In this case, each of the first and second wireless communication units 35, 45, 55 and 65 includes NFC chips, and the third wireless communication unit 70 of the terminal device 22 includes a NFC reader/writer. When the terminal device 22 is positioned near the first bicycle component 14 or 16, the NFC chip of the first bicycle component 14 or 16 becomes operable by electric power provided from the NFC reader/writer of the terminal device 22 via wireless charging. And then, the NFC chip of the first bicycle component 14 or 16 sends the unique pairing code or identification data to the NFC reader/writer of the third wireless communication unit 70. Next, when the terminal device 22 is positioned near the second bicycle component 18 or 20, the NFC chip of the second bicycle component 18 or 20 becomes operable by electric power provided from the NFC reader/writer of the terminal device 22 via wireless charging. And then, the reader/writer of the third wireless communication unit 70 sends the unique pairing code or identification data to the NFC chip of the second bicycle 18 or 20. The second controller 58 or 68 stores the pairing signal into the RAM, and then configures the second wireless communication unit 55 or 65 to transmit and receive control signals to and from the bicycle component 14 or 16.

Figure 7:
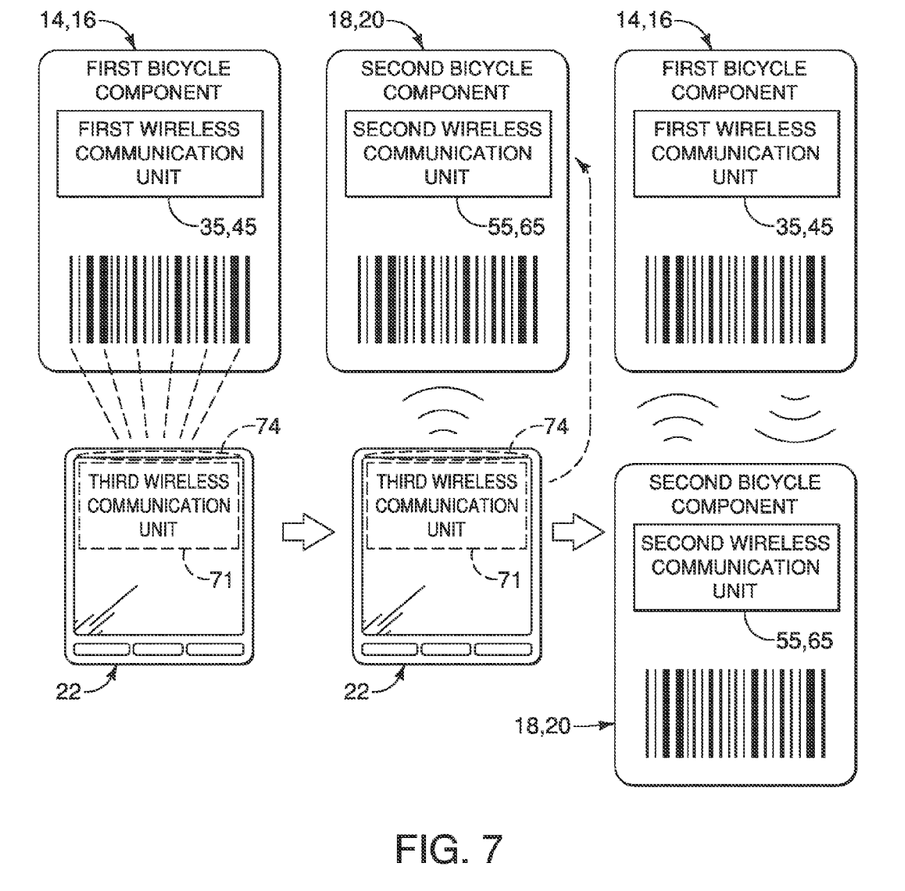
FIG. 7 is a schematic pairing process diagram illustrating a second pairing process.

Referring now to FIG. 7, a second pairing process will be discussed. In second pairing process, the scanning device 74 is used as the identification acquiring device for obtaining identification information from one of the first bicycle component 14 or 16. Therefore, in the second pairing process, the receiver 73 can be omitted from the terminal device 22. In particular, the terminal device 22 is brought into the scanning area of the first bicycle component 14 or 16 such that the scanning device 74 can detect a marking or indicia (e.g. a barcode, a two-dimensional barcode, and a serial number) for obtaining necessary identification information from the first bicycle component 14 or 16 for pairing operation. That is, the scanning device 74 is configured to read indicia on the one of the first and second bicycle components 14, 16, 18, or 20. Specifically, the scanning device 74 is configured to read a two-dimensional barcode as the indicia on the one of the first and second bicycle components 14, 16, 18, or 20.

Upon the terminal device 22 obtaining necessary identification information from the first bicycle component 14 or 16, the third controller 75 stores the pairing signal into the RAM. Next, the terminal device 22 is brought into the wireless communication area of the second wireless communication unit 55 or 65 of the second bicycle component 18 or 20 such that the receiver 56 or 66 of the second wireless communication unit 55 or 65 can detect the pairing signal of the transmitter or pairing section 72 of the terminal device 22. Thus, the transmitter or pairing section 72 of the terminal device 22 transmits the pairing signal of the first bicycle component 14 or 16 to the second bicycle component 18 or 20. The receiver 56 or 66 of the second wireless communication unit 55 or 65 detects the pairing signal from the terminal device 22. The second controller 58 and 68 stores the pairing signal into the RAM and then configures the second wireless communication unit 55 or 65 to transmit and receive control signals to and from the bicycle component 14 or 16.

Alternatively, the second pairing process can be performed by the terminal device 22 first communicating with the second bicycle component 18 or 20 to obtain the unique pairing code or identification data, then the transmitting the unique pairing code or identification data to the first bicycle component 14 or 16. Thus, in this second pairing process, the scanning device 74 as part of the identification acquiring section 71 is configured to read the indicia on the one of the first and second bicycle components, and the pairing section 72 is configured to wirelessly transmit the pairing information to the other of the first and the second bicycle components (e.g., one of the devices 14, 16, 18 and 20). The pairing information includes identification information of the other of the first and second bicycle components (e.g., one of the devices 14, 16, 18 and 20). As mentioned above, the identification acquiring section 71 is configured to acquire a serial number as the identification information from one of the first and second bicycle components.

Figure 8:
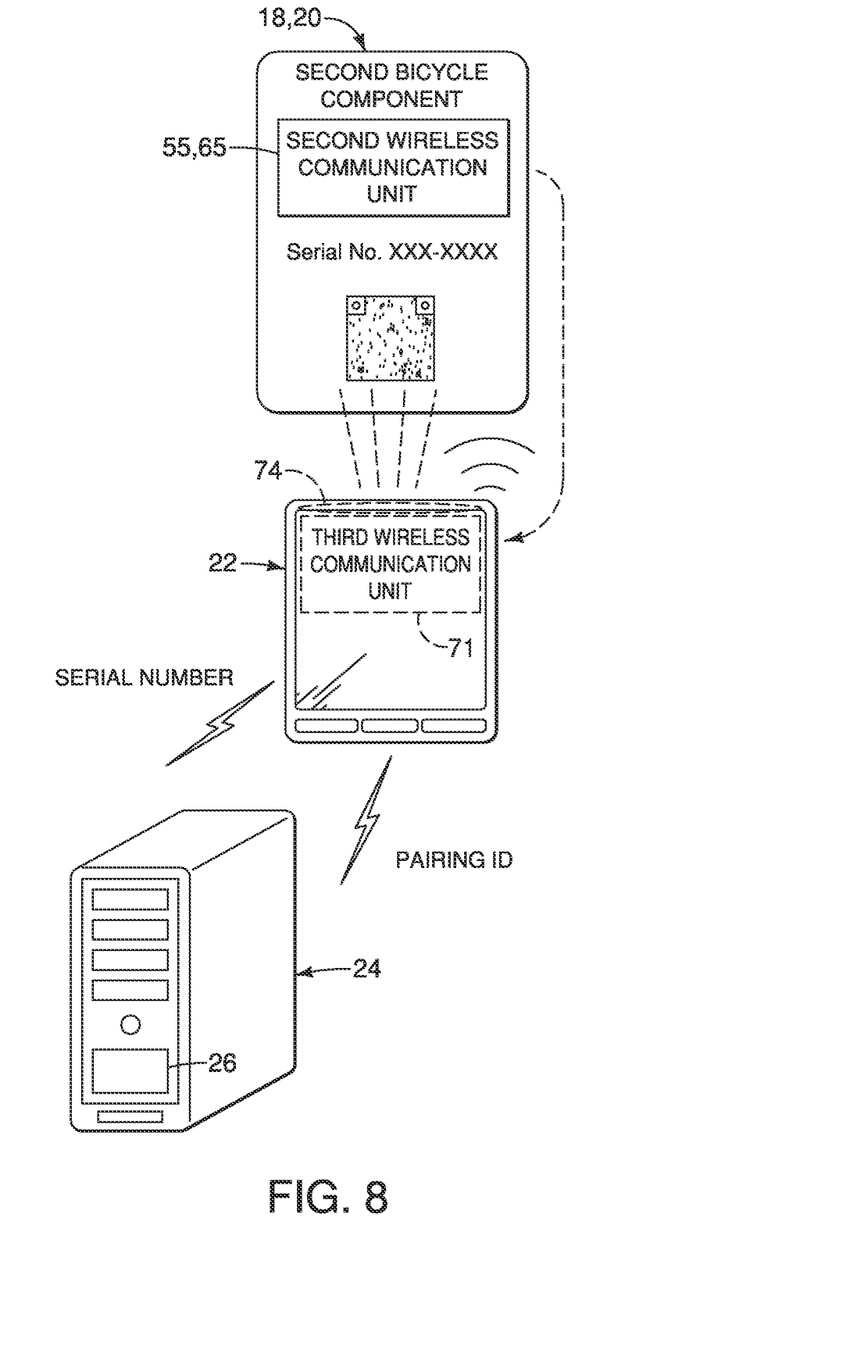
FIG. 8 is a schematic pairing process diagram illustrating a third pairing process.

Referring now to FIG. 8, a third pairing process will be discussed. In third pairing process, either the receiver 73 of the third wireless communication unit 70 or the scanning device 74 is used as the identification acquiring device for obtaining identification information from one of the second bicycle component 18 or 20. In contrast to the first and second pairing processes, in the third pairing process, the terminal device 22 is configured to access a remote database with the identification information and pairing information associated with the identification information. In particular, the terminal device 22 is brought into the vicinity of the second bicycle component 18 or 20 so that the necessary identification information can be obtained from the second bicycle component 18 or 20 for pairing operation by either wireless communications as in the first pairing process or by scanning as in the second pairing process.

Upon the terminal device 22 obtaining necessary identification information from the second bicycle component 18 or 20, the third wireless communication unit 70 wirelessly communicates via the internet or other network to the remote server 24 that has the remote database 26 which includes the identification information and pairing information associated with the identification information that is needed for carrying out the pairing operation. Now, the terminal device 22 is brought into the wireless communication area of the second wireless communication unit 55 or 65 of the second bicycle component 18 or 20 such that the receiver 56 or 66 of the second wireless communication unit 55 or 65 can detect the pairing signal of the transmitter or pairing section 72 of the terminal device 22. Thus, the transmitter or pairing section 72 of the terminal device 22 transmits a pairing signal with pairing information that associates the first bicycle component 14 or 16 to the second bicycle component 18 or 20. The receiver 56 or 66 of the second wireless communication unit 55 or 65 detects the pairing signal from the terminal device 22. The second controller 58 or 68 then configures the second wireless communication unit 55 or 65 to transmit and receive control signals to and from the bicycle component 14 or 16. Alternatively, in the third pairing process, the terminal device 22 can communicate with the first bicycle component 14 or 16 instead of the second bicycle component 18 or 20. Alternatively, in the third pairing process, the terminal device 22 includes a database with the identification information and pairing information associated with the identification information. In this case, the remote database can be omitted. In the modified third pairing process, the terminal device 22 receives necessary identification information from the second bicycle component 18 or 20. Then, the transmitter 72 is configured to wirelessly transmit the pairing information to the second bicycle component.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle wireless system. Accordingly, these directional terms, as utilized to describe the bicycle wireless system should be interpreted relative to a bicycle in an upright riding position on a horizontal surface and that is equipped with the bicycle wireless system. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle wireless system comprising:
   a first bicycle component having a first base member configured to be mounted to a bicycle and including a first wireless communication unit;
   a second bicycle component having a second base member configured to be mounted to the bicycle and including a second wireless communication unit; and
   a terminal device including an identification acquiring section configured to acquire identification information from one of the first and second bicycle components, and a pairing section configured to pair the first and second bicycle components for wireless communications.

2. The bicycle wireless system according to claim 1, wherein
   the terminal device includes a third wireless communication unit, the identification acquiring section including a receiver of the third wireless communication unit.

3. The bicycle wireless system according to claim 1, wherein
   the terminal device includes a third wireless communication unit, the pairing section being a transmitter of the third wireless communication unit.

4. The bicycle wireless system according to claim 1, wherein
   the pairing section is configured to wirelessly transmit the identification information to the other of the first and second bicycle components.

5. The bicycle wireless system according to claim 1, wherein
   the identification acquiring section includes a scanning device.

6. The bicycle wireless system according to claim 5, wherein
   the scanning device is configured to read indicia on the one of the first and second bicycle components.

7. The bicycle wireless system according to claim 6, wherein
   the scanning device is configured to read a two-dimensional barcode as the indicia on the one of the first and second bicycle components.

8. The bicycle wireless system according to claim 1, wherein
   the terminal device includes a database with the identification information and pairing information associated with the identification information.

9. The bicycle wireless system according to claim 8, wherein
   the pairing section is configured to wirelessly transmit the pairing information to the other of the first and the second bicycle components.

10. The bicycle wireless system according to claim 8, wherein
    the pairing information includes identification information of the other of the first and second bicycle components.

11. The bicycle wireless system according to claim 1, wherein
    the terminal device is configured to access a remote database with the identification information and pairing information associated with the identification information.

12. The bicycle wireless system according to claim 11, wherein
    the pairing section is configured to wirelessly transmit the pairing information to the other of the first and the second bicycle components.

13. The bicycle wireless system according to claim 11, wherein
    the pairing information includes identification information of the other of the first and second bicycle components.

14. The bicycle wireless system according to claim 1, wherein
    the identification acquiring section is configured to acquire a serial number as the identification information from one of the first and second bicycle components.

15. A terminal device comprising:
    an identification acquiring section configured to acquire identification information from one of a first bicycle component configured to be mounted to a bicycle and including a first wireless communication unit and a second bicycle component configured to be mounted to the bicycle and including a second wireless communication unit; and
    a pairing section configured to pair the first and second bicycle components for wireless communications.

16. A bicycle component comprising:
    a first wireless communication unit configured to wirelessly transmit identification information of the bicycle component to a terminal device or configured to wirelessly receive identification information of another bicycle component from a terminal device for wirelessly pairing the bicycle component and the another bicycle component, the bicycle component and the another bicycle component being configured to be mounted to a bicycle that is the same bicycle.

\* \* \* \* \*